United States Patent [19]

Martin et al.

[11] Patent Number: 5,737,687
[45] Date of Patent: Apr. 7, 1998

[54] SELF-ATTENUATING RF TRANSCEIVER SYSTEM USING ANTENNA AND MODEM INTERFACES AND CABLE LINK

[75] Inventors: Christopher B. Martin, El Cajon; Richard K. Kornfeld; Sherman Gregory, both of San Diego, all of Calif.

[73] Assignee: Qualcomm Incorporated, San Diego, Calif.

[21] Appl. No.: 398,619

[22] Filed: Mar. 1, 1995

[51] Int. Cl.[6] .................................................. H04B 3/36
[52] U.S. Cl. ............................ 455/14; 455/115; 455/126; 455/129; 455/282; 333/17.1
[58] Field of Search .......................... 455/14, 126, 67.4, 455/67.1, 66, 115, 129, 282, 3.2, 289, 226.1, 73; 333/17.1, 17.2, 18, 28 R; 379/58

[56] References Cited

U.S. PATENT DOCUMENTS

| | | | |
|---|---|---|---|
| 4,592,093 | 5/1986 | Ouchi et al. | 455/3.2 |
| 5,506,549 | 4/1996 | Crutcher | 333/18 |
| 5,574,992 | 11/1996 | Cugan et al. | 455/126 |

FOREIGN PATENT DOCUMENTS

| | | | |
|---|---|---|---|
| 0534681 | 3/1993 | European Pat. Off. | H04B 1/04 |
| 0558210 | 9/1993 | European Pat. Off. | H04B 7/005 |
| 0622907 | 11/1994 | European Pat. Off. | H04B 1/38 |
| 2253119 | 8/1992 | United Kingdom | H04Q 7/04 |
| 2268365 | 1/1994 | United Kingdom | H04B 7/005 |

Primary Examiner—Reinhard J. Eisenzopf
Assistant Examiner—Philip J. Sobutka
Attorney, Agent, or Firm—Russell B. Miller; Brian S. Edmonston

[57] ABSTRACT

A transceiver system for interfacing digital modems with radio frequency signals including an antenna, an antenna interface system and a modem interface system separated by a cable. The antenna is placed in a location having optimal reception and in close proximity to the antenna interface system. The cable couples the antenna interface system to the modem interface system. The modem interface system includes a two state variable attenuator and an attenuation register that are configured to either reduce the strength of the receive (Rx) signal when the modems are located near a base station, or to transmit the Rx signal without attenuation when the concentrated subscriber unit is at a more distant location. The outgoing, or transmit (Tx), signal is also attenuated in a similar manner to the incoming signal. A signal loss detection system includes a detector located in the modem interface system that receives an oscillating signal transmitted from the antenna interface system through the coaxial cable. A differentiating integrator then determines the amount of signal loss experienced by this oscillating signal during transmission through the coaxial cable and attenuates the signal from the antenna interface system accordingly so the amount of loss experienced remains constant. DC power is transmitted from the modem interface system to the antenna interface system through the coaxial cable. A maximum power limiting system detects when the signal being generated exceeds the capacity of the transmit power amplifier and transmits an alarm signal to the modem interface system.

22 Claims, 4 Drawing Sheets

SELF-ATTENUATING RF TRANSCEIVER SYSTEM USING ANTENNA AND MODEM INTERFACES AND CABLE LINK

BACKGROUND OF THE INVENTION

I. Field of the Invention

The present invention relates to wireless telecommunications. More particularly, the present invention relates to a radio frequency transceiver system for interfacing radio frequency signals with digital modems used for wireless telecommunication.

II. Description of the Related Art

Wireless telephone systems provide telephone service via the use of a subscriber unit and base station that communicate with each other using radio frequency (RF) signals. The subscriber unit provides an individual, called a "subscriber", with an interface to the base station and the base station provides the subscriber unit with an interface to a call processing center. Cellular wireless telephone systems incorporate the use of multiple base stations scattered over a given area thereby allowing the subscriber unit to be used in a highly mobile fashion. The subscriber unit often resembles a compact telephone hand-set having an antenna, and is normally carried by the subscriber during operation to make and receive telephone calls in a completely mobile fashion.

Digital wireless telephone systems process and transmit the data associated with a communication session or phone call in various specialized manners in order to utilize the available RF bandwidth more efficiently than analog wireless telephone systems. In order to accomplish this processing the subscriber unit for a digital wireless telephone system includes a modem that converts both voice and data information between analog and digital signal formats, and an RF transceiver system including an antenna and RF signal processing circuitry. The modem is configured to properly demodulate signals provided by the transceiver system that are within a range of decibel (dB) levels that correspond to the range of distances from the base station in which the subscriber unit is expected to operate.

Code division multiple access (CDMA) digital wireless telecommunication systems, well known in the art, place the RF signals used for communication in a spread spectrum waveform via the use of a spreading code in order to further increase RF bandwidth efficiency of the system. Within some CDMA digital wireless telecommunication systems the strength of the outgoing signal is varied substantially over time in a tightly controlled manner to reduce the interference between RF signals generated by the various subscriber units. This allows the maximum number of communication sessions to be carried out over a given amount of RF bandwidth. Because of this substantial amount of power variation, however, power limiting is also performed to ensure that the transceiver system is not damaged from overloading. One implementation of such power limiting is described in U.S. patent application Ser. No. 08/203,151 entitled "Reverse Link, Transmit Power Correction and Limitation in a Radiotelephone System" filed Mar. 3, 1993 and assigned to the assignee of the present invention. Both the power limiting functions and the power control functions require that the modem and the RF transceiver system interface via various control signals since both play a part in the determining the strength of the outgoing RF signal.

The transceiver system and modem that make up a subscriber unit for a digital wireless telephone system are generally kept in close proximity to each other during operation. This is done primarily to keep the subscriber unit compact for purposes of mobility, which has traditionally been the main advantage of wireless telephone systems. Other advantages are also provided by the compact configuration, however. One advantage is that the sensitivity to environmental variations of the subscriber unit is reduced by keeping the length of the connections between the systems that make up the subscriber unit small. This reduces the concern that these environmental parameters will affect the performance of the subscriber unit. Another advantage is that the signal processing circuitry within the transceiver system is located in close proximity to the antenna. This allows the incoming, or receive (Rx), signal to be processed after reception by the antenna with as little signal loss and noise introduction as possible. Finally, keeping the subscriber unit compact facilitates the exchange of control signals between the modem and the transceiver system. This allows the two systems to cooperate when performing various functions including the power limiting function described above within the context of a CDMA wireless telephone system.

Compact configuration of the subscriber unit does not necessarily provide for optimal transmission and reception of the RF signals used to conduct wireless communication, however. This is because the subscriber unit is normally located near the subscriber during use, and the subscriber is often in a poor location for the reception and transmission of RF signals including within a building or behind a hill. This less than optimal placement of the transceiver systems is tolerated, however, because of the various benefits created by compact configuration of the subscriber unit described above, including mobility.

In some wireless telecommunications systems, however mobility is not a primary concern. Such a system is described in co-pending U.S. patent application Ser. No. 08/384,291 entitled "Concentrated Subscriber System for Wireless Local Loop" filed on Jan. 31, 1995 and assigned to the assignee of the present invention. The concentrated subscriber system provides wireless telephone service at a reduced cost when compared to previous wireless telephone systems by allowing multiple subscribers to interface with a base station via RF signals using a set of shared modems and a transceiver system. In the preferred embodiment the modems used within the subscriber system are the same or similar to those used in prior art mobile subscriber units so that the development cost of the concentrated subscriber system is reduced. The concentrated subscriber system is placed in a fixed location during use that can be within as great or greater range of distances from the base station than those experienced by the prior art mobile subscriber unit. This is because the concentrated subscriber unit is intended to provide inexpensive non-mobile telephone service both in areas where mobile telephone service is and is not available, and therefore in areas where a base station may or may not be close by. In the preferred embodiment the concentrated subscriber system incorporates the use of CDMA wireless telephone system technology.

Because the concentrated subscriber system is not mobile during use there is no need for compactness as with the prior art mobile subscriber unit. Therefore, the reception of the concentrated subscriber system can be improved by positioning the antenna away from the subscriber in a location having improved RF signal transmission and reception capability. In order for such a configuration to operate properly within a digital wireless environment, however, it is desirable to have the various additional benefits provided in the compact systems to also be provided within this less compact configuration. These benefits include the simplified exchange of control signals between the transceiver system and the modem system, the close placement of the RF signal processing circuitry to the antenna within the transceiver system, and the ability to operate under varying environmental conditions. Therefore, it is desirable to provide a transceiver system that can provide these benefits while also allowing for optimal placement of the antenna. Additionally, since the concentrated subscriber system utilizes the digital modems from a standard mobile subscriber unit in the preferred embodiment to reduce cost, but can be located at a greater range of distances from the base station during use, it is also desirable to have that transceiver system adjust the strength of the Rx signal to the range of decibel levels in which the modems were originally designed to operate, so that processing of the signals by the modems may proceed properly.

SUMMARY OF THE INVENTION

Based on the forgoing, a transceiver system for a wireless telephone concentrated subscriber system that allows an antenna to be placed in a location having optimal reception and that can interface with existing or minimally modified digital modems is described. The transceiver system includes an antenna, an antenna interface system and modem interface system separated by a coaxial cable. The antenna is placed in a location having optimal reception such as the roof of a building and in close proximity to the antenna interface system. The coaxial cable couples the antenna interface system to the modem interface system which is placed within the building so that it may be easily accessed for service and configuration, and so that it may be coupled to the rest of the concentrated subscriber system.

In order to allow modems designed for use in existing mobile subscriber units to be used to demodulate the RF signal received by the antenna, the modem interface system includes a two state variable attenuator and an attenuation register that are configured to either reduce the strength of the incoming signal when the concentrated subscriber system is located near a base station, or to pass the incoming signal without attenuation when the concentrated subscriber unit is at a more distant location. Once the concentrated subscriber system is put in place a signal loss detection system fixes the amount of signal loss experienced by the "receive" (Rx) signal before being supplied to the modems and the transmit (Tx) signal before being provided to the antenna as the environmental conditions change. The signal loss detection systems includes a detector located in the modem interface system that receives an oscillating signal transmitted from the antenna interface system through the coaxial cable and an attenuator controlled by the detector. A differential integrator within the signal loss detection system determines the difference between the oscillating signal and a reference value accordingly so the loss experienced by the Rx and Tx signals remains constant or is "normalized."

Additionally, DC power is transmitted from the modem interface system to the antenna interface system through the coaxial cable so that the antenna interface system may be easily installed and positioned with consideration only to optimal reception and not the availability of power. The antenna interface system allows multiple modems to generate a signal using a single power amplifier circuit by including a maximum power limiting system that detects when the signal being generated exceeds the capacity of the transmit power amplifier, and that transmits an alarm signal to the modem interface system in response so that the modem interface system can signal the rest of the concentrated subscriber system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for providing radio frequency interface to a concentrated subscriber system is described. In the following description the invention is described within the context of a code division multiple access digital cellular telephone system. It will be apparent to one skilled in the art that the invention may be practiced within a variety of radio based wireless telecommunication systems using digital or analog modulation using single or multiple base stations, or satellite based gateways. Also, while a coaxial cable is used in the following description, the use of other wire based transmission media will be apparent. In various other instances variable attenuation of certain signals is performed in order to achieve desired decibel level. It will be understood that variable amplification of these signals may be used to provide similar results. Also in the following description, various well known systems and interfaces are provided in block form. This is done in order to avoid unnecessarily obscuring the disclosure of the present invention.

Figure 1:
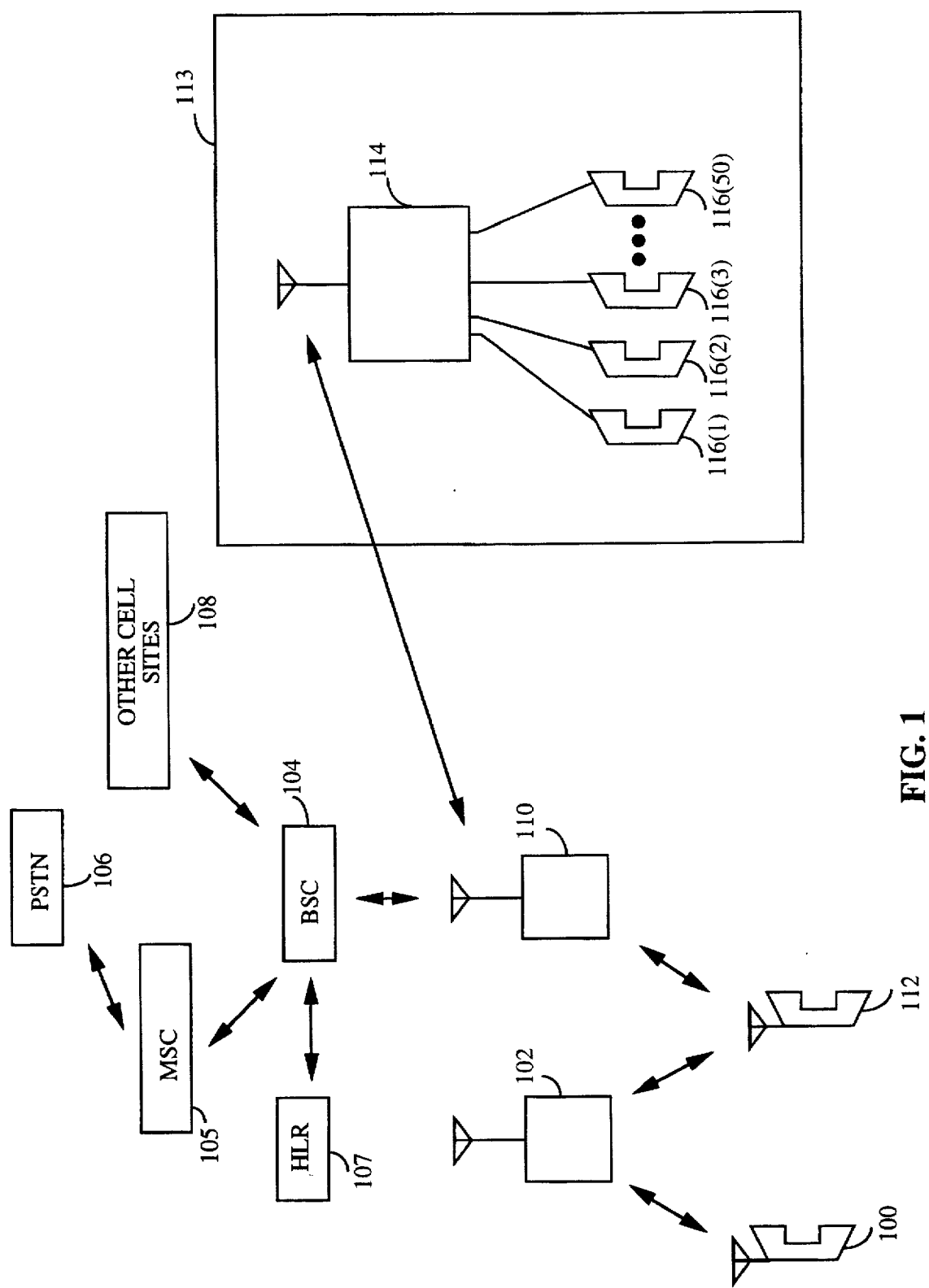
FIG. 1 is a diagram of a cellular telephone system configured in accordance with one embodiment of the invention.

FIG. 1 is a block diagram of a cellular telephone system configured in accordance with one embodiment of the present invention. Base transceiver station 102 transmits and receives radio frequency (RF) signals to and from remote communication units 100 and 112. In the preferred embodiment these RF signals are modulated in accordance with the CDMA spread spectrum techniques described in U.S. Pat. No. 4,901,307 ('307) entitled "Spread Spectrum Multiple Access Communication System Using a Satellite or Terrestrial Repeater", and U.S. Pat. No. 5,103,459 ('459) entitled "System and Method for Generating Signal Wave forms in a CDMA Cellular Telephone System" assigned to QUALCOMM™ Incorporated as well as in specification IS-95 from the Telecommunication Industry Association (2001 Pennsylvania Avenue, Suite 800, Washington, DC 20006) entitled "Mobile Station-Base Station Compatibility Standard for Dual Mode Wideband Spread Spectrum Cellular System" (IS-95). Additionally, base transceiver station 102 interfaces with base station controller (BSC) 104 in any one of a variety of manners including microwave link, ground based wire connections, fiber optic cable, or a combination thereof. BSC 104 interfaces with public telephone switching network (PSTN) 106 through mobile switching center (MSC) 105 allowing various communication sessions or telephone calls to be delivered between base transceiver station 102, base transceiver station 110, and other base transceiver stations 108.

Base transceiver station 110 interfaces with BSC 104 in a similar manner as base transceiver station 102 and communicates with remote communication unit 112 and concentrated subscriber system (CSS) 113 via RF signals modulated in accordance with above referenced Pat. Nos. '459 and '307 and specification IS-95. Within CSS 113 subscriber units 116(1) through (50) are coupled to CSS controller 114 which performs the interface function with base transceiver station 110. Subscriber units 116(1) through (50) each are used in a manner similar to a standard telephone to initiate and receive telephone calls and may be standard wire based, pulse code modulated telephone sets in some instances, or other types of telephone sets having a microphone and speaker. While CSS controller 114 is shown coupled directly to subscriber units 116, alternative methods for exchanging information are contemplated including a simplified form of radio wave based communication. Additionally, alternative numbers of subscriber units 116 may be coupled to CSS controller 114 other than the fifty units indicated.

Figure 2:
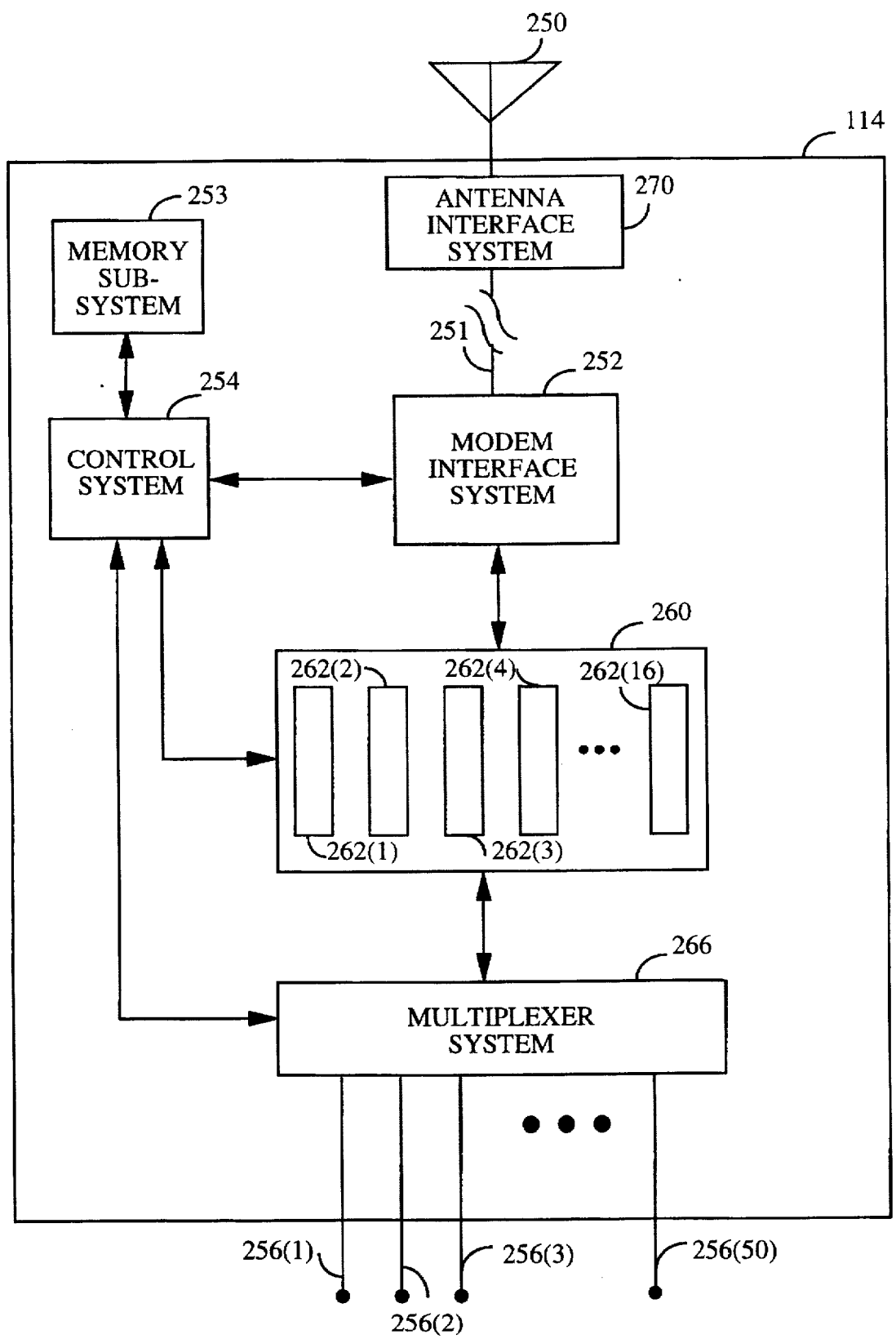
FIG. 2 is a block diagram of a concentrated subscriber system controller configured in accordance with the described embodiment of the invention.

FIG. 2 is a block diagram of CSS controller 114 of FIG. 1 configured in accordance with the described embodiment of the invention. Antenna interface system 270 transmits and receives spread spectrum modulated RF signals to and from base transceiver station 110 of FIG. 1 through antenna 250. The received signals are supplied through coaxial cable 251 and modem interface system 252 to modem bank 260 which is comprised of modems 262(1) through (16). The transmitted signals are generated by modem bank 260 and transmitted through modem interface system 252 and coaxial cable 251 to antenna interface system 270 which supplies the signals to antenna 250. Multiplexer system 266 couples subscriber lines 256(1) through (50) to modems 262(1) through (16) of modem bank 260. Control system 254 receives and provides information to modem bank 260 and controls multiplexer system 266 using information stored in memory sub-system 253. The operation and configuration of control system 254 as well as modems 262 and multiplexer system 266 is described in the above referenced co-pending application "Concentrated Subscriber System for Wireless Local Loop." While sixteen modems are shown the use of different numbers of modems is consistent with the operation of the invention.

Figure 3:
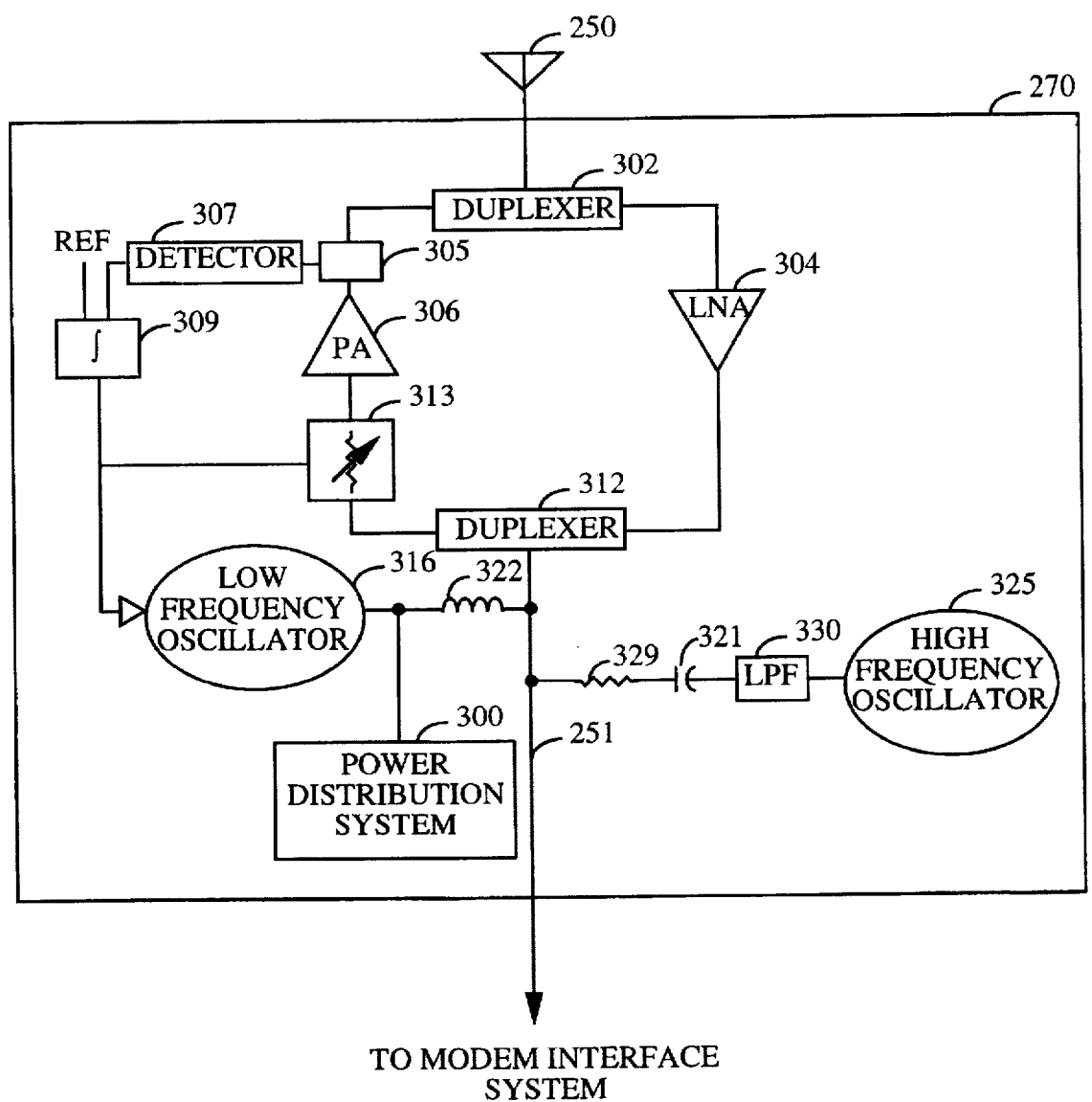
FIG. 3 is a block diagram of an antenna interface system and antenna configured in accordance with the described embodiment of the invention.

FIG. 3 is a block diagram of antenna interface system 270 when configured in accordance with one embodiment of the invention. Duplexer 302 is coupled to the input of low noise amplifier 304 and the output of coupler 305 as well as to antenna 250. Duplexer 312 is coupled to the output of low noise amplifier 304 and the input of variable attenuator 313 as well as to coaxial cable 251. Transmit power amplifier 306 is placed between coupler 305 and variable antenuator 313. Detector 307 is coupled via coupler 305 to the output of transmit power amplifier 306 and to the input of differential integrator 309 which has a reference voltage applied to the other input. The output of differential integrator 309 is applied to the control input of variable antenuator 313 and to low frequency oscillator 316. Inductor 322 connects low frequency oscillator 316 and power distribution system 300 to coaxial cable 251. High frequency oscillator 325 is coupled to coaxial cable 251 through capacitor 321, resistor 329 and lowpass filter 330. Power amplifier 306 and low noise amplifier 304 may be formed by a series of amplifier and filter circuits placed in various locations within the signal path but are shown as a single system for ease of drawing.

During operation a receive (Rx) signal received by antenna 250 is passed to duplexer 302 which directs the carrier signal to low noise amplifier 304. Low noise amplifier 304 amplifies the relatively weak Rx carrier signal to a decibel level range greater than the decibel level range properly demodulated by one of modems 262 by an amount that is at least as much as the maximum expected signal loss introduced by co-axial cable 251 and any other intermediate circuitry. The amplified Rx carrier signal is then transmitted through duplexer 312 and coaxial cable 251 to modem interface system 252 (FIG. 2). Outgoing or transmit (Tx) signals transmitted from modem interface system 252 through coaxial cable 251 are directed by duplexer 312 to variable attenuator 313 which passes the signal to power amplifier 306. The resulting amplified signal generated at the output of power amplifier 306 is passed through coupler 305 and duplexer 302 to antenna 250 from which it is transmitted to base transceiver station 110 of FIG. 1.

Detector 307 receives a signal from coupler 305 that is substantially proportional to the Tx carrier signal at the output of power amplifier 306 and asserts a proportional DC voltage that is applied to differential integrator 309. While the use of a proportional relationship between the signals at the input and output of detector 307 is preferred, other relationships that are indicative of the power being generated by power amplifier 306 may also be used and will be apparent to one skilled in the art. Differential integrator 309 generates another DC voltage signal based on the difference between the DC voltage from detector 307 and the reference voltage. If the voltage from detector 307 is less than the reference voltage, the second DC voltage from differential integrator 309 is placed at a first level which in the preferred embodiment is eleven volts, although any other voltage level may be easily substituted. Once the DC voltage from detector 307 exceeds the reference voltage the DC voltage from differential integrator 309 begins to decrease in proportion to the difference between the DC voltage from detector 307 and the reference voltage. Once again the use of a proportional relationship between the inputs and the output the system, in this case differential integrator 309, is preferred, but not necessary as other relationships between the inputs and outputs of differential integrator 309 that provide similar results will be apparent to one skilled in the art.

Variable attenuator 313 responds to this decrease in the voltage asserted by differential integrator 309 by introducing attenuation into the transmit signal received from duplexer 312. This attenuation is increased in proportion to the amount the voltage asserted by differential integrator 309 decreases. Additionally, when the DC voltage from differential integrator 309 begins to decrease below eleven volts, low frequency oscillator 316 begins to generate a low frequency signal that is transmitted through inductor 322 and coaxial cable 251 to modem interface system 252. This low frequency signal forms a power alarm signal that is used by modem interface system 252 and control system 254 to perform further power control functions. Various alternative methods of performing this feedback loop other than using a decrease in the DC voltage from differential integrator 309 to cause an increase in the amount of attenuation introduced by variable attenuator 313 will be apparent to one skilled in the art. Thus, the power of the output signal from power amplifier 306 is held at a predetermined maximum and therefore power amplifier 306 is prevented from generating an output power level beyond this predetermined maximum.

High frequency oscillator 325 constantly generates a signal loss detection signal that has a frequency close to the frequencies of the Rx and Tx signal over which the various telephone calls and other communication sessions are carried. In the preferred embodiment, this frequency should be sufficiently close to the Rx and Tx signals that the frequency loss detection signal experiences a signal loss that is similar to that experienced by the Rx and Tx signals when transmitted over coaxial cable 251. However, the use of signal loss detection signals having a frequency that are not close to the frequency of the Tx or Rx signals is also consistent with the operation of the invention. Additionally, the strength of this signal loss detection signal is tightly controlled so that the amount of loss it experiences from transmission through the coaxial cable can be measured. The signal loss detection signal is transmitted through lowpass filter 330, capacitor 321 and resistor 329 to coaxial cable 251 which passes the signal to modem interface system 252. Power distribution system 300 receives a DC voltage from modem interface system 252 over coaxial cable 251 and distributes the power to the various other systems that make up antenna interface system 270 through connections that are not shown for ease of drawing.

Figure 4:
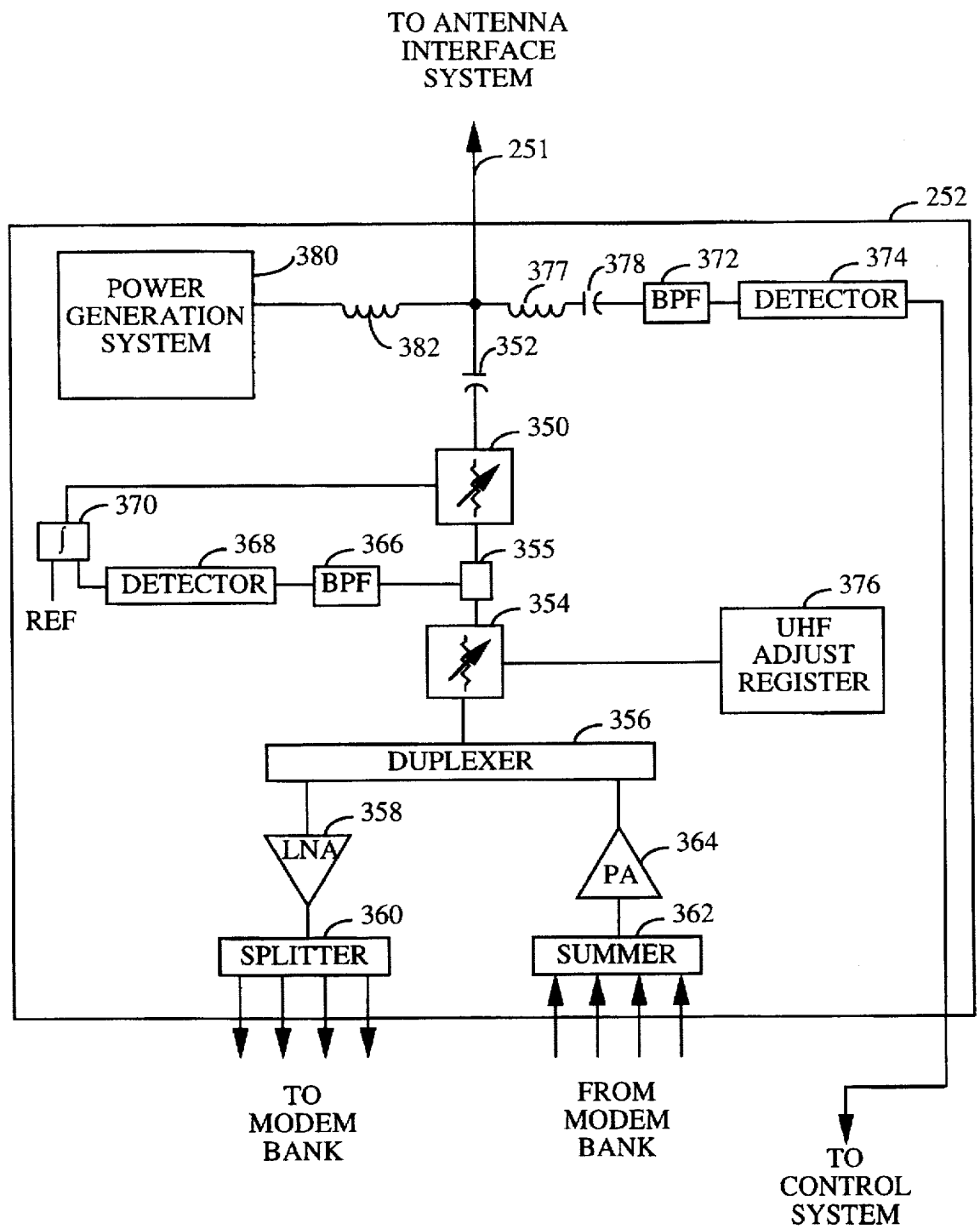
FIG. 4 is a block diagram of a modem interface system configured in accordance with the described embodiment of the invention.

FIG. 4 is a block diagram of modem interface system 252 when configured in accordance with one embodiment of the invention. The amplified Rx signal from antenna interface system 270 of FIG. 3 is passed by coaxial cable 251 to variable antenuator 350 through capacitor 352. The signal from attenuator 350 then passes through coupler 355, attenuator 354, duplexer 356, to low noise amplifier 358. Low noise amplifier 358 amplifies the signal and supplies it to splitter 360 which splits it into four signals that are provided to four modem systems (not shown), each of which has four modems that make up the sixteen modems of modem bank 260. Tx signals from the four modem systems that make up modem bank 260 of FIG. 2 are combined by summer 362 and passed through power amplifier 364, which amplifies them, duplexer 356, variable attenuator 354, coupler 355, and antenuator 350. The resulting Tx signal is then passed through capacitor 352 and coaxial cable 251 to antenna interface system 270. Power generation system 380 is coupled to coaxial cable 251 through inductor 382.

Bandpass filter 366 receives a signal from coupler 355 that is proportional to the signal at the output of attenuator 350 and filters out most of the noise and signal not at the frequency of the signal generated by high frequency oscillator 325 of FIG. 3. This causes the signal from high frequency oscillator 325 to pass to detector 368 which generates a corresponding DC voltage that is applied to the input of differential integrator 370. Differential integrator 370 generates a DC voltage based on the difference between the voltage from detector 368 and the reference voltage applied to its other input that is applied to variable attenuator 350. The signal from differential integrator 370 causes variable attenuator 350 to reduce the strength of the carrier signal from antenna interface system 270 accordingly such that the loss introduced by coaxial cable 251 will be normalized and the signal can be placed within a decibel range that can easily and properly demodulated by one of the modems 262 of modem bank 260. The reference voltage is applied to differential integrator 370 such that the attenuation introduced by variable attenuator 350 is reduced as the signal loss introduced by coaxial cable 251 increases thereby fixing the amount of signal loss introduced into the signal as it travels between the antenna interface card and the modem interface card. In the preferred embodiment the amount of signal loss is set to the maximum amount of loss expected from coaxial cable 251 alone placed in the least optimal configuration and conditions. This allows the signal strength applied to the modems to remain constant despite varying lengths of coaxial cable 251 and varying operating environments and temperatures. Power generation system 380 provides DC through coaxial cable 251 and inductor 382 to antenna interface system 270.

Bandpass filter 372 allows the low frequency signal generated by low frequency oscillator 316 of FIG. 3 to pass to detector 374 after being transmitted through inductor 377 and capacitor 378. When detector 374 receives this low frequency signal, it generates a power alarm signal that is applied to control system 254 of FIG. 2. UHF adjust register 376 is set to either activate or deactivate attenuator 354 depending on the distance concentrated subscriber system 113 of FIG. 1 is from base transceiver station 110 of FIG. 1. If the concentrated subscriber system is located in close proximity to the base transceiver station the register is set to activate attenuator 354 so that the strength of the signal received by duplexer 356 is reduced. If the CSS is located a significant distance away from base station transceiver 110, UHF adjust register 376 is set to deactivate attenuator 354 so that the signal strength applied to duplexer 356 is not reduced. This provides the concentrated subscriber system with increased dynamic range for receiving and transmitting signals, and therefore increases the range of distances in which it can properly interact with base transceiver station 110. The transmit carrier signal from modem bank 260 of FIG. 2 and summer 362 of FIG. 4 is also transmitted through attenuators 354 and 350 which helps ensure that the difference between the decibel level of the receive and transmit carrier signals remains within a predetermined range which in the preferred embodiment is that prescribed by the IS-95 specification. However, it is also contemplated that the Tx carrier signal could bypass antenuator 354 if such a configuration was desirable.

By providing a transceiver system that couples the antenna to a concentrated subscriber system through a coaxial cable as described above, a concentrated subscriber system can be implemented that has improved transmission and reception capability. This is because when such a transceiver system is incorporated into a concentrated subscriber system, the antenna can be placed in a remote location where the RF signals used for communication can be transmitted and received more easily while the subscriber units remain in close proximity to the subscribers. The ability to use the coaxial cable to connect the antenna to the concentrated subscriber system is made possible by the self regulating signal loss control capability provided via the use of an antenna interface system that generates a high frequency signal transmitted through the coaxial cable and a modem interface system that adjusts the amount of attenuation introduced into the carrier signal based on the loss experienced by that high frequency signal. This allows the signal loss to be normalized over a variety of cable lengths and configurations, and over a variety of environmental conditions including temperature, so that the decibel level of the signal applied to the modems will be within a desired range. The ability to place the antenna in an optimal location is further enhanced by the transmission of power from the modem interface system to the antenna interface system through the coaxial cable which eliminates the need to place the transceiver system in close proximity with a power source.

Additionally, the use of the UHF adjust register within the modem interface system increases the range of distances from the base station within which the concentrated subscriber system can operate properly using prior art standard digital modems by allowing the modem interface system to be configured for additional signal attenuation. This allows prior art digital modem to be utilized within the concentrated subscriber system thereby reducing the cost of developing and implementing the concentrated subscriber system. The use of a power output detect circuit placed in the antenna interface system that signals the modem system with a low frequency signal transmitted through the coaxial cable provides power control and limiting functionality within the transceiver system. This power control and limiting functionality allows a concentrated subscriber system incorporating the described transceiver system to utilize CDMA digital cellular modems which must vary the power output significantly in order to conduct a phone call as described above. The use of CDMA digital cellular modems is desirable because of the improved bandwidth utilization and communication quality they provide.

Thus a transceiver system for interfacing with digital cellular modems is described. Various alternative embodiments of the invention will be apparent to one skilled in the art. The exemplary embodiment provided above is merely for purposes of illustration and should not be taken as limiting the scope of the invention.

We claim:

1. A wireless telephone transceiver system comprising:

an antenna for receiving and transmitting radio frequency signals;

an antenna interface system coupled to said antenna for processing said radio frequency signals, said antenna interface system including a low noise amplifier for amplifying said radio frequency signals following reception thereof by said antenna with minimum noise introduction, a power amplifier coupled to said antenna for generating an outgoing radio frequency signal for transmission by said antenna, a variable attenuator coupled to said power amplifier for attenuating said outgoing radio frequency signal prior to transmission, and a power output detection circuit for controlling said variable attenuator by generating and applying an attenuation signal to said variable attenuator when said power amplifier generates a signal having a power level greater than a predetermined level;

a coaxial cable for propagating said radio frequency signals, said coaxial cable having a first end and a second end wherein said first end is coupled to said antenna interface system; and a first oscillation generation circuit coupled to said coaxial cable for introducing a first oscillating signal into said coaxial cable; and a second oscillation generation signal for generating a second oscillation signal in response to said attenuation signal; and a modem interface system coupled to said second end of said coaxial cable for processing said radio frequency signals.

2. The wireless telephone transceiver system as set forth in claim 1 wherein said modem interface system comprises a second variable attenuator coupled to said coaxial cable for normalizing the loss experienced by said radio frequency signals propagated through said coaxial cable; and a power loss detection circuit for determining a signal loss amount based on said first oscillating signal and adjusting said second variable attenuator in response thereto, such that said modem interface system receives radio frequency signals from said antenna interface system via said coaxial cable without significant variation caused by any time-varying losses along the coaxial cable.

3. The wireless telephone transceiver system as set forth in claim 1 wherein said modem interface system further comprises:

a DC power source coupled to said coaxial cable for delivering DC power to said antenna interface system via said coaxial cable, and wherein said antenna interface system further comprises a power distribution circuit for receiving said DC power from said modem interface system through said coaxial cable and for distributing said DC power.

4. The wireless telephone transceiver system as set forth in claim 1 wherein said modem interface system further comprises:

a power alarm sensor for detecting said second oscillating signal and for generating a power alarm signal in response thereto.

5. The wireless telephone transceiver system as set forth in claim 1 wherein said antenna interface system and said antenna are placed in a location having improved radio frequency reception capability and in close proximity to each other.

6. The wireless telephone transceiver system as set forth in claim 1 wherein said modem interface system further comprises:

a second variable attenuator that receives said radio frequency signals; and an adjust register for controlling said second variable attenuator.

7. A wireless telephone transceiver system comprising:

means for receiving and transmitting radio wave signals;

first means for processing said radio wave signals coupled to said means for receiving and transmitting that places said radio wave signals in condition for transmission, said first means including means for amplifying said radio wave signals with minimum noise introduction following reception thereof by said means for receiving and transmitting radio wave signals, power amplifier means, coupled to said means for receiving and transmitting radio wave signals, for generating an outgoing radio frequency signal for transmission by said means for receiving and transmitting radio wave signals, variable attenuator means coupled to said power amplifier means for attenuating said outgoing radio wave signal prior to transmission, and a power output detection means for controlling said variable attenuator by generating and applying an attenuation signal to said variable attenuator when said power amplifier means generates a signal having a power level greater than a predetermined level;

a conductive cable for propagating said radio wave signals, said conductive cable having a first end and a second end wherein said first end is coupled to said first means for processing; and a first oscillation generation means coupled to said conductive cable for introducing a first oscillating signal into said conductive cable; and a second oscillation generation means for generating a second oscillation signal in response to said attenuation signal; and a second means for processing radio wave signals, coupled to said second end of said conductive cable, that places said radio waves in condition for demodulation.

8. The wireless telephone transceiver system as set forth in claim 7 wherein said second means for processing comprises second variable attenuator means coupled to said conductive cable for normalizing the loss experienced by said radio wave signals propagated through said conductive cable; and means for determining a signal loss amount based on said first oscillating signal and adjusting said second attenuator means in response thereto, such that said second means for processing receives radio wave signals from said first means for processing via said conductive cable without significant variation caused by any time-varying losses along the conductive cable.

9. The wireless telephone transceiver system as set forth in claim 7 wherein said second means for processing further comprises:

means for delivering power to said first means for processing said conductive cable, and wherein said first means for processing further comprises means for receiving power from said second means for processing through said conductive cable and for distributing said power to said means for amplifying and said means for generating.

10. The wireless telephone transceiver system as set forth in claim 7 wherein said second means for processing further comprises:

means for detecting said second oscillating signal and for generating a power alarm signal in response thereto.

11. The wireless telephone transceiver system as set forth in claim 7 wherein said means for receiving and said first means for processing are placed in a location having improved radio wave signal reception capability and in close proximity to each other.

12. The wireless telephone transceiver system as set forth in claim 7 wherein said second means for processing further comprises:

a second variable attenuation means that receives said radio wave signals; and an storage means for controlling said second variable attenuation means.

13. A method for processing radio frequency signals comprising the steps of:

receiving a radio frequency signal by
(a) receiving said radio frequency signal using an antenna;
(b) amplifying said radio frequency signal using a low noise amplifier;
(c) passing said radio frequency signal and a first oscillating signal over a conductive cable;
(d) determining an amount of signal loss introduced by said conductive cable using said first oscillating signal; and
(e) attenuating said radio frequency signal based upon said amount of signal loss; and transmitting a radio frequency signal by
(f) generating an output signal for transmission by said antenna using a power amplifier; and
(g) generating a second oscillating signal for transmission over said conductive cable when said power amplifier generates a signal having a power level greater than a predetermined level.

14. The method as set forth in claim 13 further comprising the steps of:

storing information that indicates a desired amount of attenuation; and attenuating said radio frequency signal in a constant manner in accordance with said stored information.

15. The method as set forth in claim 13 wherein step (d) comprises the steps of:

receiving said first oscillating signal after being transmitted through said conductive cable; and determining a signal loss amount based on how strong said first oscillating signal is after being received.

16. The method as set forth in claim 15 further comprising the step of:

delivering power to said antenna interface system from said modem system through said conductive cable.

17. A concentrated subscriber transceiver system comprising:

an antenna for receiving and transmitting radio frequency signals;

an antenna interface system coupled to said antenna;

a bank of modems;

a modem interface system coupled to said bank of modems; and a coaxial cable interconnecting said modem interface system and said antenna interface system, said coaxial cable for transmitting radio frequency signals and a first oscillating signal between said antenna interface system and said modem interface system;

with said antenna interface system processing radio frequency signals received by said antenna for transmission to said modem interface system and for processing radio frequency signals received from said modem interface system for transmission to said antenna; and with said modem interface system processing radio frequency signals received from said bank of modems for transmission to said antenna interface system and for processing radio frequency signals received from said antenna interface system for transmission to said bank for modems; and said antenna interface system includes means for detecting whether power for transmission of signals by said antenna exceeds a predetermined threshold and for generating and transmitting a second oscillating signal over said coax cable.

18. The concentrated subscriber transceiver system of claim 17 wherein said antenna interface system includes means for limiting the transmission power of signals for transmission by said antenna.

19. The concentrated subscriber transceiver system of claim 17 wherein said modem interface system includes means for detecting said second oscillating signal and means for generating an alarm in response thereto.

20. The concentrated subscriber transceiver system of claim 17 wherein said modem interface system includes means for attenuating the power of signals for transmission to the antenna interface system for subsequent transmission by said antenna in response to input identifying whether a base station for receiving signals transmitted by said antenna is within a predetermined distance.

21. The concentrated subscriber transceiver system of claim 17 wherein said modem interface system includes means for transmitting DC power through said coaxial cable to said antenna interface system for powering said antenna interface system.

22. The concentrated subscriber transceiver system of claim 17 wherein said modem interface system includes means for determining an amount of signal loss occurring within said coaxial cable and for compensating therefor to normalize the level of radio frequency signals received through the coaxial cable from said antenna interface system.

* * * * *